United States Patent [19]

Zettler et al.

[11] 4,249,074

[45] Feb. 3, 1981

[54] INTRUSION DETECTOR FOR PRESS BRAKE

[75] Inventors: John F. Zettler, Stow, Mass.; Harold F. Twyman, Birmingham, Mich.

[73] Assignee: Xenex Corporation, Birmingham, Mich.

[21] Appl. No.: 913,253

[22] Filed: Jun. 6, 1978

[51] Int. Cl.³ .............................................. H01J 39/00
[52] U.S. Cl. .................................... 250/221; 340/556
[58] Field of Search ............... 250/221, 222; 340/555, 340/556, 557

[56] References Cited

U.S. PATENT DOCUMENTS 3,723,738  3/1973  Brenner et al. ................... 250/221 X Primary Examiner—David C. Nelms
Assistant Examiner—Darwin R. Hostetter
Attorney, Agent, or Firm—Reising, Ethington, Barnard, Perry & Brooks

[57] ABSTRACT

An intrusion detection system is disclosed for safeguarding an operator of an industrial machine such as a press brake. A light screen barrier (420) comprises sequentially pulsed beams (422) which are spaced far enough apart to permit penetration by a work piece (144) without obstructing more than one beam whereas penetration by the operator's hand will obstruct at least two adjacent, successively pulsed beams. A pulse train of regularly spaced signal pulses (BRS) with each pulse corresponding to a light beam is produced when none of the light beams are obstructed. A missing pulse detector (600, 40') with a logic circuit (502) produces a control signal for stopping the machine only when two or more adjacent light beams are obstructed causing two or more successive missing pulses in the pulse train.

7 Claims, 9 Drawing Figures

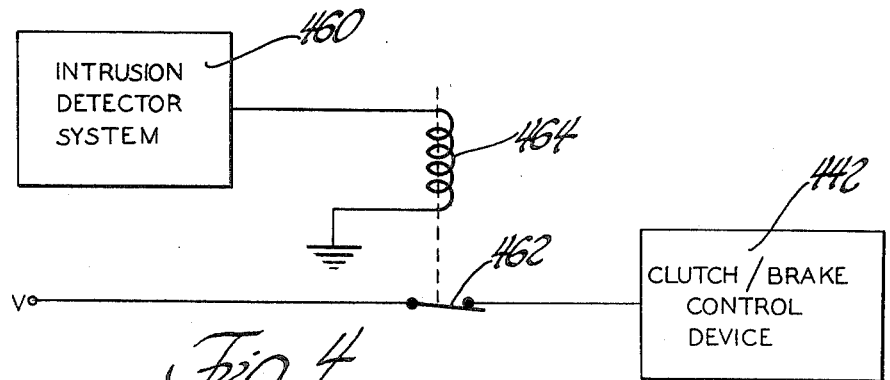
Fig. 4
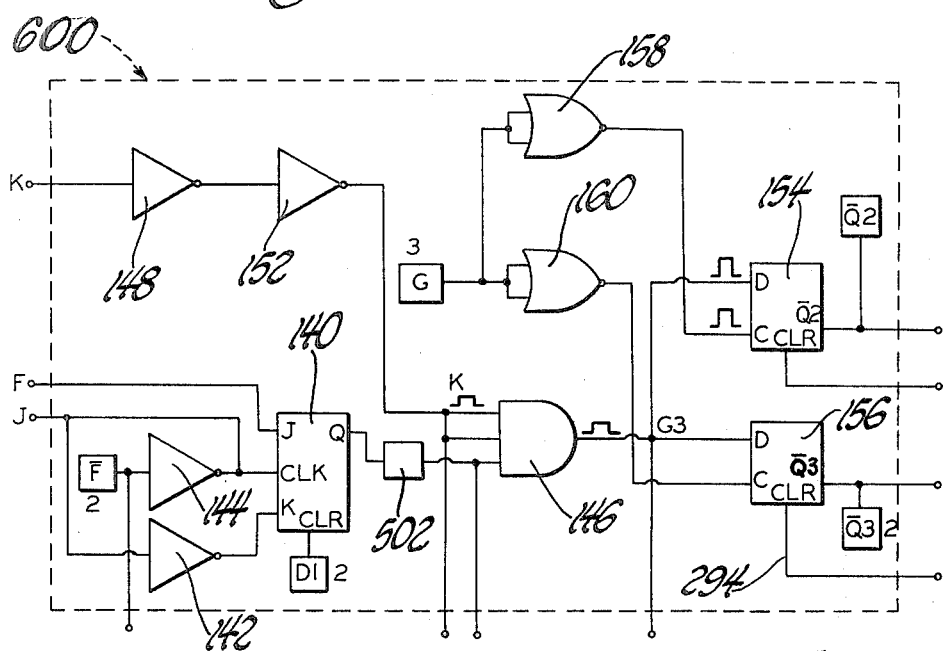
Fig. 6
Fig. 9

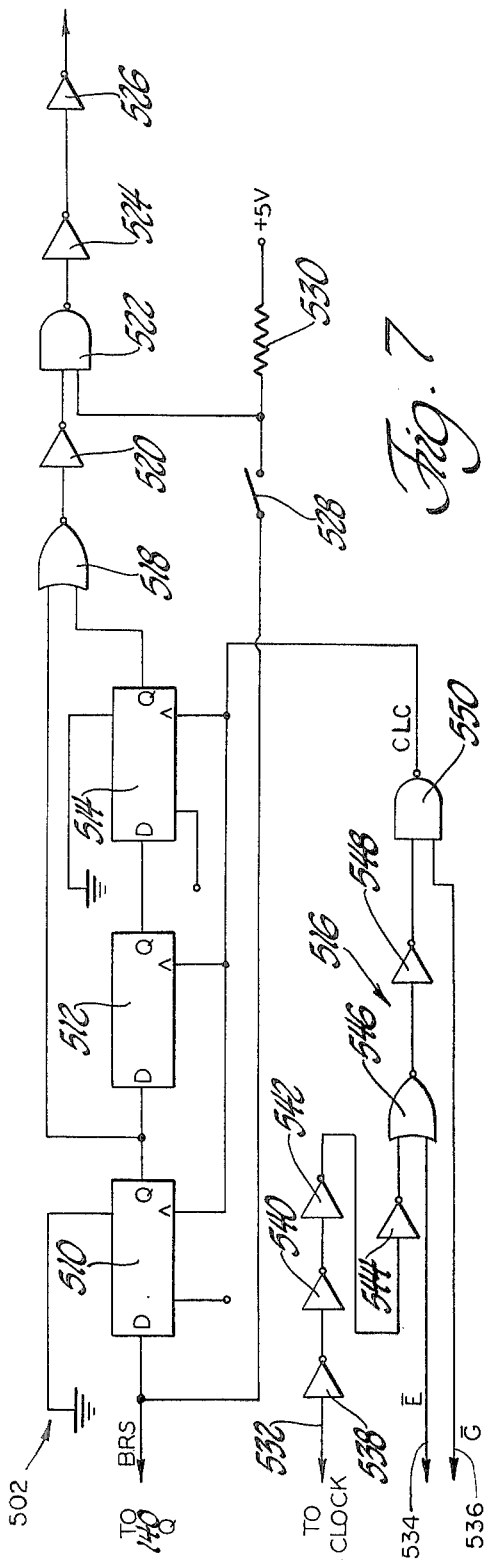
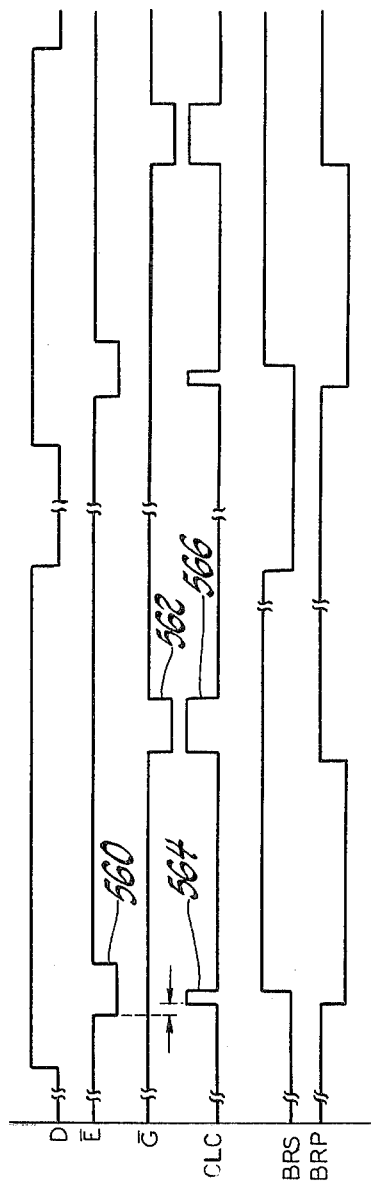

INTRUSION DETECTOR FOR PRESS BRAKE

TECHNICAL FIELD

This invention relates to intrusion detection systems of the electronic type. More particularly, it relates to such systems which are especially adapted for use as a safeguard on industrial machines.

BACKGROUND ART

In presence or intrusion detection systems it is known to use radiant energy or light beams to define a boundary of the space or region which is to be guarded or maintained under surveillance. Such a system, especially adapted for safeguard of industrial machines is disclosed in U.S. Pat. No. 3,970,846 granted July 20, 1976 to Schofield et al for "Presence Detecting System with Self-Checking" and assigned to the same assignee as this invention. The entire disclosure of this patent is hereby incorporated by reference into this application.

Certain industrial machines are difficult to safeguard to prevent injury to the operator without causing serious interference with the operation of the machine or restriction on the operator. For example, a metal bending machine such as a press brake, typically requires that the sheet metal workpiece be grasped by the operator at one portion while another portion is being formed in the die. For protection of the operator, there should be a barrier between the operator and the pinch-point in the die at a safe distance from the pinchpoint; however, the workpiece would have to extend through the barrier to be grasped by the operator and, furthermore, the workpiece must be allowed freedom of movement in the region of the barrier. A mechanical barrier cannot be used because it would interfere with movement of the workpiece during the forming operation. A barrier of the light beam type which forms a "light screen" or a "light curtain" has not heretofore provided an adequate solution. In such a light beam device, the workpiece would be detected as an intrusion through the light screen and the machine would be stopped. Muting of a light screen type of safety device during the down stroke of the slide of the machine does not afford continuous or a full time protection for the operator.

DISCLOSURE OF THE INVENTION

According to this invention, a safeguard device is provided which utilizes a light screen and which includes means to distinguish between an intrusion of the light screen by a workpiece and an intrusion by the hand of the operator. In this device, the light screen is formed of a multiplicity of discrete light beams and an intrusion detection means discriminates between the interruption of a single light beam, as would be caused by the workpiece, and an intrusion which interrupts two or more consecutively adjacent light beams, as would be caused by the operator's hand. The system includes control means which will stop the machine when two or more consecutively adjacent light beams are interrupted but will allow continued running when only one light beam is interrupted.

Additionally, the safeguard system of the invention is provided with a self-checking system to insure that the operator will not rely upon the intrusion detection system for protection if, in fact, a malfunction has occurred in the detection system.

A more complete understanding of this invention may be obtained from the detailed description that follows, taken with the accompanying drawings.

BRIEF DESCRIPTION OF DRAWINGS

FIG. 4 is a diagram of another embodiment of this invention;

FIG. 6 is a logic diagram of the missing pulse detector of FIG. 5;

FIG. 7 is a logic diagram;

FIG. 8 is a timing diagram, and

FIG. 9 is a state diagram for aid in explaining operation of the system.

BEST MODE FOR CARRYING OUT THE INVENTION

Figure 1:
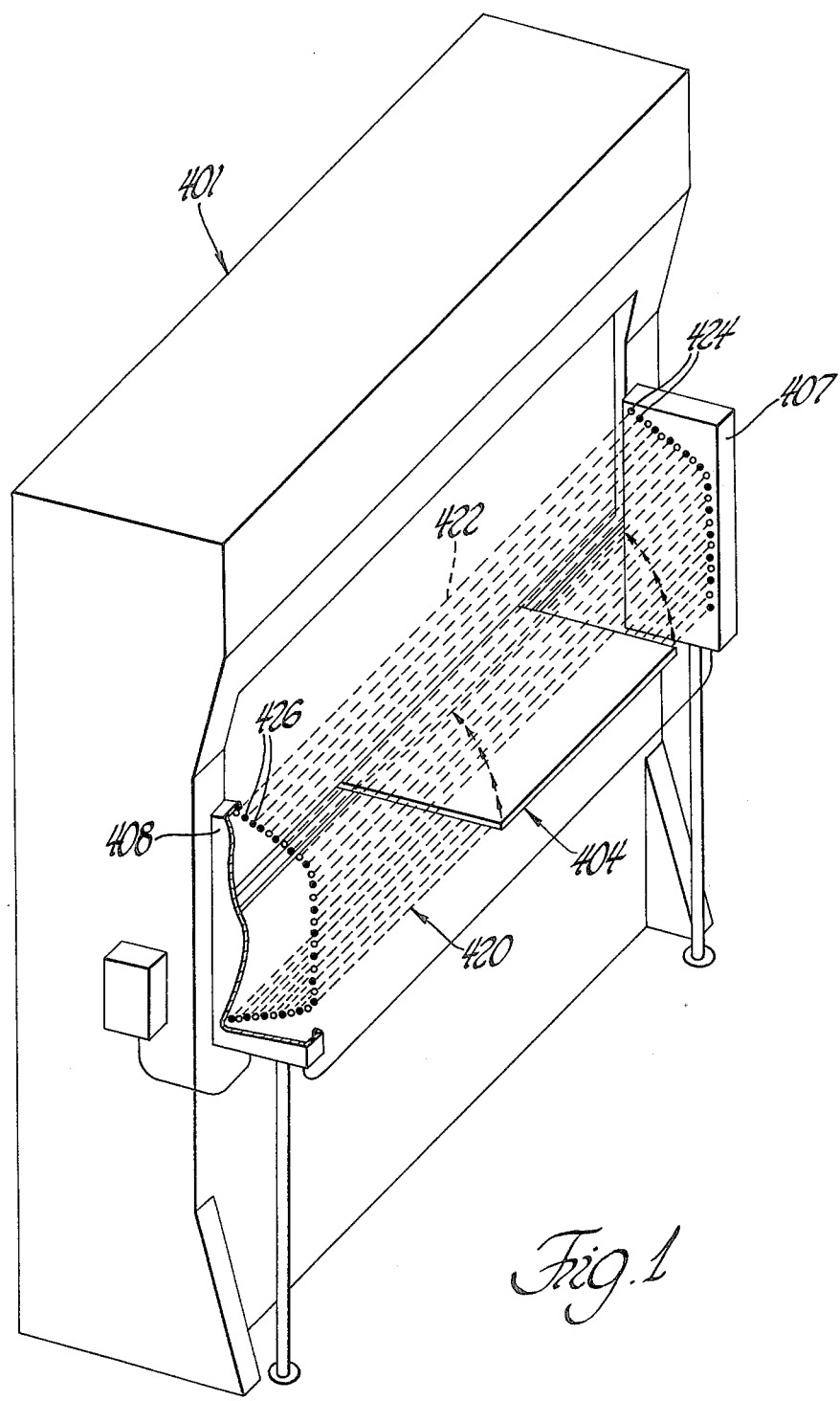
FIG. 1 depicts a press brake with the intrusion detection system of this invention.

Referring now to the drawings, the invention will be described with reference to a typical application in an intrusion detection system for safeguarding a press brake. Two embodiments of the invention will be described.

Figure 2:
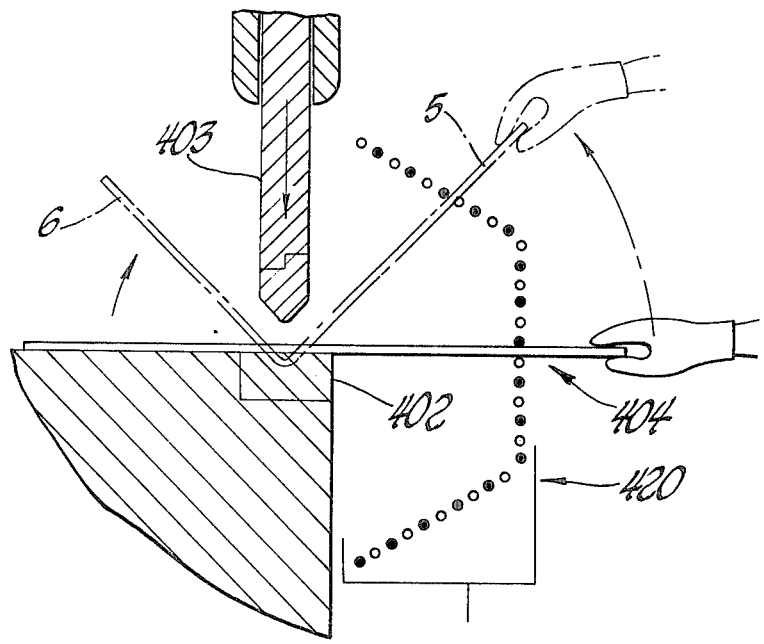
FIG. 2 shows greater detail of the device of FIG. 1.
Figure 3:
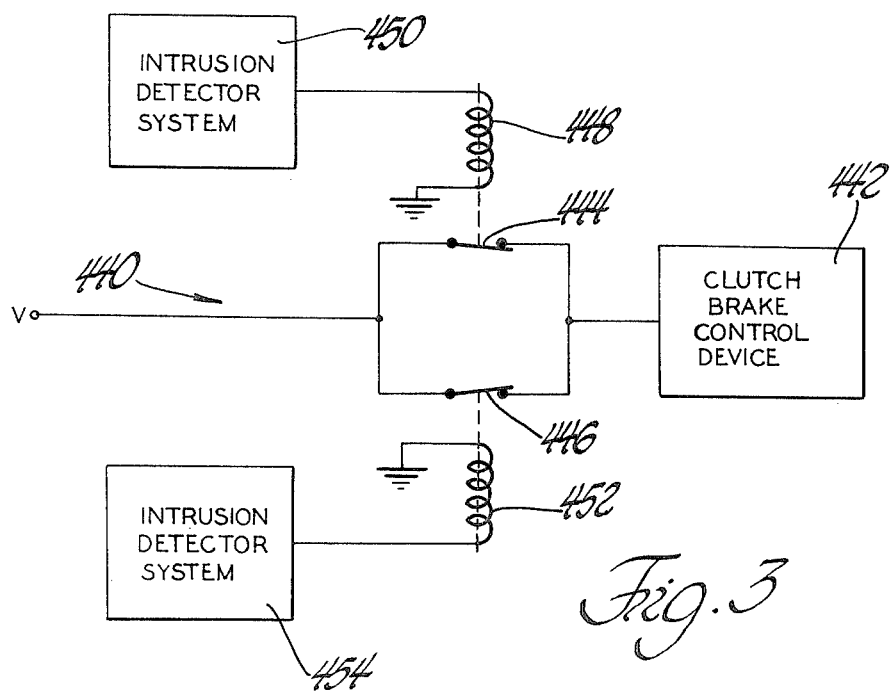
FIG. 3 is a diagram of one embodiment of this invention.

The first embodiment is shown in FIGS 1, 2 and 3. A conventional press brake 401, having a die 402 and a slide 403, is adapted to form a workpiece 404, such as a piece of sheet metal. In particular, for illustrative purposes, the die and slide are adapted to operate upon a flat piece of sheet metal to provide a right angle bend in the metal. It will be understood that closing of the die against the workpiece as the slide moves downward causes the outer edge 5 of the workpiece to move upwardly through an arc as indicated in FIG. 2. Similarly, the innermost edge 6 of the workpiece moves upwardly through an arc as the die is progressively closed.

A protective barrier is provided between the operator and the pinchpoint or die of the machine. This barrier is provided by a light screen formed by a multiplicity of discrete light beams extending across the front of the press brake. The light screen 420 must be positioned relative to the pinchpoint by a minimum safe distance so that the operator's hand can not be moved through the light screen and into the pinchpoint in less time than would be required to stop movement of the slide. On the other hand, the light screen must be positioned relative to the pinchpoint so that the operator may retain a grasp on the outer edge of the workpiece during the forming operation without having his hand penetrate the light screen. For this reason it is desirable to have the light screen 420 with a cross-sectional configuration in the form of a trough or U-shape, as shown in the drawings.

The light screen 420 is comprised of a multiplicity of discrete light beams 422 which are spaced apart in parallel relationship to each other. The spacing between adjacent beams is at least as large as the thickness of the workpiece so that the workpiece can be moved in a direction perpendicular to the plane of the workpiece and perpendicular to the direction of the light beams without interrupting more than one beam. The spacing between adjacent beams, however, is less than the thickness of a person's finger so that an operator's hand cannot penetrate the light screen without interrupting at least two light beams. In order to produce the light screen, a light transmitting pylon or mast 407 is provided at one side of the press brake and a light receiving pylon or mast 408 is provided at the other side. The light transmitting mast 407 is provided with multiple light emitting diodes 424, each of which is adapted to emit a sharply defined narrow infrared beam in response to an electrical pulse. The receiving mast 408 is is provided with multiple phototransistors 426, each of which is adapted to produce an electrical pulse in response to impingement thereon of an infrared pulse. As indicated in the drawings, there is one photodetector 426 aligned with one of the light emitting diodes 424.

The first embodiment of the invention is illustrated in FIG. 3. The press brake is provided with a clutch/brake control circuit 440 which is energized with a source of voltage V and which includes a clutch/brake control device 442. The control device 442 controls the application of the brake in the drive train to the slide of the press brake. When the supply voltage is applied to the clutch-brake control device 442 the clutch is engaged and the brake is disengaged. When the voltage supply is disconnected from the control device the brake is applied and the clutch is disengaged. The circuit 440 includes relay contacts 444 and relay contacts 446 in parallel between the source of voltage and the control device. The relay contacts 444 are actuated by a relay coil 448 which is controlled by an intrusion detector system 450. Similarly, the relay contacts 446 are actuated by a relay coil 452 which is controlled by an intrusion detector system 454. In the normal running condition of the press brake, i.e. with the clutch engaged and the brake disengaged, relay contacts 444 and 446 are closed. Relay contacts are closed when the respective relay coils 448 and 452 are deenergized. If the intrusion detector system 450 detects an intrusion by interruption of a single beam, the relay coil 448 will be deenergized and the contacts 444 will be opened. Similarly, if the intrusion detector system 454 detects an intrusion by the interruption of a single beam, the relay coil 452 will be deenergized and the relay contacts 446 will be open. It will be apparent that when both contacts 444 and 446 are open the control device 442 is deenergized and the brake will be applied and the clutch will be disengaged to bring the press brake to a stop. However, if only contacts 444 are open and contacts 446 are closed, or vice versa, the control device will remain energized and the press brake will continue running.

The mast 407 is provided with two sets of light emitting diodes and the mast 408 is provided with two sets of photodetectors. The light emitting diodes in the first set are depicted by white dots and the photodetectors in the first set are depicted by white dots. The first set is a part of intrusion detector system 450. The light emitting diodes in the second set are depicted by black dots and the photodetectors in the second set are depicted by block dots. The second set is a part of intrusion detecting system 454. Each of the presence detecting systems 450 and 454 is identical to that disclosed in U.S. Pat. No. 3,970,846 referred to above.

In operation of the first embodiment of the invention as shown in FIG. 3, the system discriminates between penetration of the light screen by a workpiece and penetration of the light screen by the operator's hand. In the case of the workpiece penetration, only one light beam is interrupted and if that light beam is associated with intrusion detector system 450 and relay contacts 444 will open. However, the intrusion detection system 454 will be unaffected and the relay contacts 446 will remain closed. Hence, the clutch remains energized and the brake remains deactuated and the press brake continues to run. In a similar manner, if the workpiece interrupts a light beam associated with intrusion detector system 454, relay contacts 446 will open but contacts 44 remain closed and the press brake continues to run. On the other hand, if the operator's hand penetrates the light screen, a light beam associated with intrusion detector system 450 and a light beam associated with intrusion detector system 454 will both be interrupted. This will cause both relay contacts 444 and 446 to open and the control device 442 will be deenergized causing the clutch to become disengaged and the brake to become engaged to stop the press brake.

The second embodiment of the invention is shown in FIGS. 4 through 9. In this embodiment, a single intrusion detector system 460 is provided and is capable of discriminating between penetration of the light screen by the workpiece and penetration by the operator's hand. As shown in FIG. 4, the clutch/brake control device 442 is connected with the supply voltage through a relay contact 462. The relay contact is actuated by a relay 464 which in turn is controlled by the intrusion detection system 460. When the relay coil 464 is energized, as shown, the contacts 462 are closed and the control device 442 is energized. This causes the clutch to be engaged and the brake to be disengaged allowing the press brake to continue running.

Figure 5:
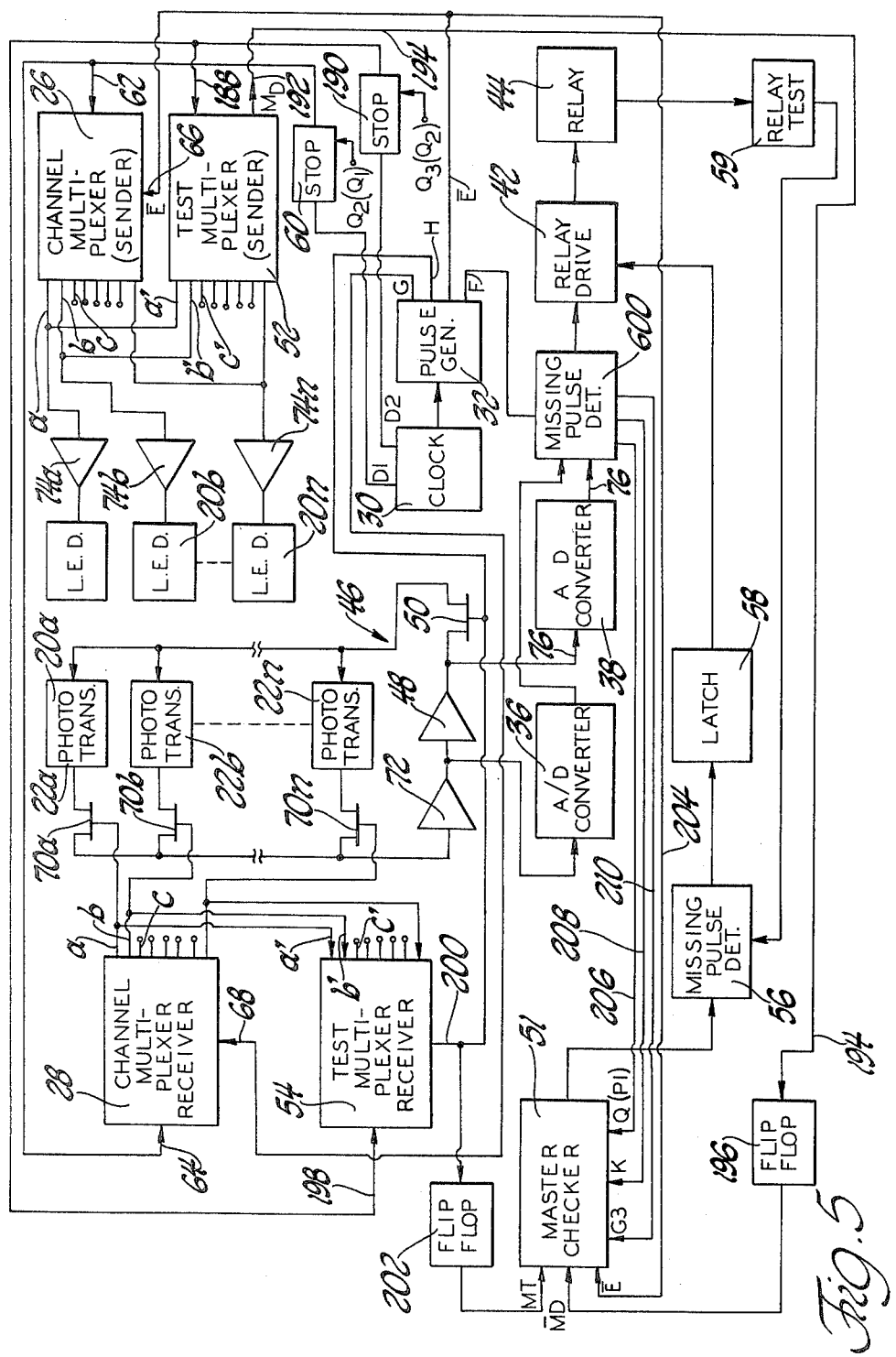
FIG. 5 is a block diagram of the system of FIG. 4.

The intrusion detector system 460 is shown in detail in FIGS. 5, 6 and 7. A block diagram of the system 460 is shown in FIG. 5; this system, with the exception of missing pulse detector 600, is fully described (with the same reference characters as in FIG. 5) in U.S. Pat. No. 3,970,846, referred to above. The missing pulse detector 600 is shown in FIG. 6 hereof and is the same as the missing pulse detector 40 of U.S. Pat. No. 3,970,846, except for the inclusion of logic circuit 502 shown in FIG. 6. The logic circuit 502, as will be described in detail below, causes the missing pulse detector 600 to ignore a single missing pulse in a train of pulses but to respond to the occurrence of two successive missing pulses in a train of pulses.

In this second embodiment of the invention, the light screen is the same as that shown in FIG. 1 except that there is only one set of light emitting diodes 424 and only one set of phototransistors 426. (This arrangement would be represented in FIGS. 1 and 2 if the light emitting diodes represented by the black dots and the phototransistors represented by the black dots were removed, leaving the set of diodes and phototransistors represented by the white dots.) The light beams produced by the single set of light emitting diodes are spaced far enough apart to allow the workpiece to fit therebetween but they are close enough so that the operator's finger cannot fit therebetween.

Referring now to FIG. 5, it will be understood that in operation of the intrusion detector system, a train of uniformly spaced pulses is produced by the A/D converter 38 so long as none of the light beams in the light screen is interrupted. Each pulse in the pulse train corresponds to a certain light emitting diode and its associated phototransistor and those pulses which occur in immediate time succcession, i.e. are adjacent each other in the pulse train, are produced by phototransistors which are immediately adjacent each other. The output of the A/D converter 38 is applied through a conductor 78 to the input of the missing pulse detector 600. The missing pulse detector is operative to energize the relay drive circuit 42 so long as there are not two or more missing pulses in succession in the pulse train. As long as the relay drive circuit 42 is energized the relay 454 is energized and contacts 462 thereof (see FIG. 4) remain closed and the press brake continues to run. Accordingly, the workpiece may extend through the light screen and so long as it only interrupts one light beam, the missing pulse detector 600 will maintain the relay drive circuit 42 energized and the machine continues running. On the other hand, if the operator's hand penetrates the light screen at least two adjacent light beams will be interrupted and the missing pulse detector 600 will denergize the relay drive 42 and the relay contacts 462 will be opened and the control device 442 will disengage the clutch and apply the brake to bring the press brake to a stop.

As shown in FIG. 7, the logic circuit 502 has its input connected with the Q output of the flip-flop 140. The output of the logic circuit 502 is applied to one input of the AND gate 146. The logic circuit comprises a set of registers or flip-flops 510, 512 and 514. The D input of the flip-flop 510 is connected with the Q output of the flip-flop 140 and the Q output of the flip-flop 510 is connected with the D input of flip-flop 512. The Q output of flip-flop 512 is connected with the D input of flip-flop 514. The clock inputs of the flip-flops 510, 512 and 514 are all connected with the output of a clock signal generator 516 which produces the clock signal CLC. The clock signal generator 516 will be described presently. The Q output of the flip-flop 510 is applied to one input of a NOR gate 518 and the Q output of flip-flop 514 is applied to the other input of the NOR gate 518. The output of the NOR gate 518 is applied through an inverter 520 to one input of a NAND gate 522. The output of the NAND gate is applied through an inverter 524 and a driver 526 to the input of the AND gate 146. The output of the flip-flop 140 is connected through a switch 528 to the other input of the NAND gate 522. When the switch 528 is closed, the logic circuit is effectively bypassed and is rendered ineffective. When the switch 528 is open, the logic high voltage is applied through a resistor 530 to the other input of the NAND gate 522 and the logic circuit is effective.

The clock signal generator 516 has an input 532 which receives the high frequency clock signal (40 kHz) of the system. Another input 534 receives the $\overline{E}$ signal and another input 536 receives the $\overline{G}$ signal of the system. The high frequency clock pulse is applied through a string of four inverters 538, 540, 542 and 544 to impose a slight time delay of approximately 150 nanoseconds and thence is applied to one input of a NOR gate 546. The $\overline{E}$ signal is applied to the other input of the NOR gate 546. The output of the NOR gate is applied through an inverter 548 to one input of a NAND gate 550. The $\overline{G}$ signal is applied to the other input of the NAND gate 550. As can be seen from the timing diagram of FIG. 8, the NAND gate 550 produces the clock signal CLC. This output is applied to the clock inputs of the flip-flops 510, 512 and 514.

Referring now to the timing diagram of FIG. 8, the signal D is a clock signal of equal low time and high time and represents the cycle time for the multiplexers in the intrusion detector system 460. One light emitting diode in the light screen is pulsed during each multiplexer cycle and, provided there is no obstruction in the light beam channel, the phototransistor produces an output pulse which is transformed into a beam response signal pulse, BRS, in the train of pulses from the flip-flop 140. The signal $\overline{E}$ is high throughout the cycle time except for a low pulse 560. During the $\overline{E}$ time of pulse 560, a self-check is performed in the system and during the self-check the output of the logic circuit at driver 526 must be low or the system will be shut down because of an indicated malfunction. The signal $\overline{G}$ is high throughout the cycle except for a low pulse 562 which occurs later in the cycle than the $\overline{E}$ pulse 560. The clock signal CLK is low throughout the cycle except for a first high pulse 564 which occurs during the $\overline{E}$ pulse 560 and a high pulse 566 which occurs at the same time as the $\overline{G}$ pulse 562. The output of the logic circuit is depicted by the signal BRP shown at the lower part of the timing diagram.

In operation, the beam response signal BRS will remain low throughout the cycle if the light beam channel corresponding to the multiplexer cycle under consideration is obstructed. On the other hand, if the channel is unobstructed the signal BRS will go high during the corresponding cycle time. The signal BRS, either high or low, is continuously applied to the D input of the flip-flop 510. Each of the flip-flops 510, 512 and 514 respond at the clock input to a rising or positive-going pulse by assuming a high or low state, whichever is applied to its D input at the time. Accordingly, a rising pulse at the clock inputs of the flip-flops cause flip-flop 510 to assume the state of the BRS signal, and causes the flip-flop 512 to assume the state previously held by the flip-flop 510 and causes the flip-flop 514 to assume the state previously held by flip-flop 512.

Referring now to the state diagram of FIG. 9, the state of the flip-flops 510, 512 and 514 is shown at five different state times, S1, S2, S3, S4 and S5. Note on the timing diagram that state 1, S1, occurs before the $\overline{E}$ pulse 560 and therefore the beam responsive signal $BRS_n$ represents the last state of the BRS signal, either low or high. Therefore the contents or state of flip-flop 510 is shown as $BRS_n$. At the same state time S1, the state of flip-flop 512 is zero since, as will be seen below, it occurs during the $\overline{E}$ pulse 560 and must be low or the system would have shut down. In state 1, flip-flop 514 is in a state designated $BRS_{n-1}$ which represents the state of BRS, either high or low, in the cycle preceding the last cycle. During state 1, for explanatory purposes, it will be assumed that $BRS_n$ in flip-flop 510 is high and $BRS_{n-1}$ in flip-flop 514 is low. Note that the outputs of flip-flops 510 and 514 are applied to the NOR gate 518. These inputs cause the output of the NOR gate to be low and the inverter 520 applies a high input to the NAND gate 522. With the switch 528 open, which renders the logic circuit operative, the other input to the NAND gate 522 is high and accordingly the output of the NAND gate is low. This is applied through the inverter 524 and causes the signal BRP to be high. This high signal is applied through the driver 526 to the AND gate 146. in this condition, which is produced by the interrruption of a single beam by the workpiece, the clutch/brake control device maintains the clutch engaged and the brake in the off condition and the press brake continues to run. This is the condition as the cycle under consideration and represented by the timing diagram of FIG. 8 is started.

In the cycle time shown in FIG. 8, the clock signal CLK produces a rising pulse during the $\overline{E}$ pulse 560. This rising pulse at the clock inputs of the flip-flops 510, 512 and 514 causes the states to propagate forward one step, as represented by the state diagram during state S2. In this condition a beam response signal BRS at the output of the flip-flop 140 is low because it is taken at self-check time of the pulse $\overline{E}$ 560. The flip-flop 512 is in state $BRS_n$ and the flip 514 holds a zero. Thus, the input to the NOR gate 518 at this time during state S2 causes the output signal BRP to be low. This allows the press brake to continue running, unless of course the self-check is failed and then the machine is shut down.

At time S3 the rising pulse 566 of the clock signal CLK is applied to the clock inputs of the flip-flops 510, 512 and 514. At this time the present BRS signal $BRS_{n+1}$ is at the input of flip-flop 510. At state time S3 the signal BRS is high and flip-flop 510 is high, flip-flop 512 is low and flip-flop 514 is high. Accordingly, the output signal BRP is high and the machine continues to run.

During the next cycle time, at state time S4 the flip-flop 510 is low, because it occurs during self-check time, the flip-flop 512 is in a state corresponding to $BRS_{n+1}$ and the flip-flop 514 is low. During the state time S5 the flip-flop 510 is in a state corresponding to the signal $BRS_{n+2}$, the flip-flop 512 is low and the flip-flop 514 is in a state corresponding to $BRS_{n+1}$. It will be appreciated that if two adjacent beams are interrupted, as by the hand of the operator penetrating the light screen, the beam response signal BRS will remain low during two consecutive cycles. This would be the case if signal $BRS_n$ were low and $BRS_{n+1}$ were low. In such a case, at state time S3 the output of flip-flop 510 would be low and the output of flip-flop 514 would be low and this would cause the signal BRP to go low. When signal BRP goes low the contacts 462 are opened and the clutch/brake control device 442 is deenergized and the clutch is disengaged and the brake is applied to stop the machine.

Although the description of this invention has been given with reference to a particular embodiment it is not to be construed in a limiting sense. Many variations and modifications will now occur to those skilled in the art. For a definition of the invention reference is made to the appended claims.

The embodiments of the present invention in which an exclusive property or privilege is claimed are defined as follows:

1. In an intrusion detection system of the type including a plurality of light beam sources and photodetectors arranged in plural sets with a light source and a photodetector in each set, the source and photodetector of each set defining a light beam channel and being disposed so that the light beam from the source impinges upon the photodetector in the absence of an obstruction in the beam channel, said plural sets being arranged with the respective light beam channels in spaced relation with each other and defining a screen of predetermined configuration, means for cycically energizing each of the light beam sources to produce repeated light pulses in each channel with the light pulses occurring successively in the successive channels, means coupled with the photodetectors for producing a signal having successive cycles with each cycle corresponding to one of the channels, each cycle including a signal pulse corresponding to a respective light pulse in the absence of an obstruction in the corresponding channel, and signal pulse detection means coupled with the last mentioned means, the improvement wherein said pulse detection means comprises first means for storing a first state signal having one state if any one of said cycles includes a signal pulse and having another state if said one of said cycles does not include a signal pulse and for storing a second state signal having said one state if the cycle immediately succeeding said one cycle includes a signal pulse and having said another state if the cycle immediately succeeding said one cycle does not include a signal pulse, and second means coupled with said first means for producing a first control signal.

2. The invention as defined in claim 1 wherein said first means includes a first shift register for storing said first state signal and a second shift register for storing said second state signal, a clock coupled with said first and second shift registers for shifting the contents thereof at least once for each of said cycles, whereby the first and second state signals represent successive cycles of said signal, and wherein said second means includes logic means coupled with said first and second registers.

3. The invention as defined in claim 2 wherein said logic means includes logic gates for producing a pulse when said registers are shifted only if the state signal in either the first or second register has said one state whereby said first control signal is a pulse train with a missing pulse in the pulse train only when the state signal in both said first and second registers have said another state.

4. The invention as defined in claim 3 including a missing pulse detector coupled with said logic means for producing a second control signal in response to a single missing pulse in said first control signal.

5. The invention as defined in claim 4 wherein said missing pulse detector comprises a flip-flop adapted to switch to a stable state in response to a single missing pulse.

6. The invention as defined in claim 3 including a third shift register coupled between the first and second shift registers, said clock producing two clock pulses during each cycle and being coupled with said third shift register for shifting the contents of said first, third and second shift registers, one of said clock pulses being a self-checking clock pulse which shifts said registers during a self-checking interval, and means for inhibiting said second means from producing said first control signal during said self-checking interval.

7. The invention as defined in claim 1 including means for disabling said first means.

* * * * *